United States Patent [19]

Alband

[11] Patent Number: 5,082,702
[45] Date of Patent: Jan. 21, 1992

[54] TAMPER-INDICATING TAPE

[75] Inventor: Todd D. Alband, Eagan, Minn.

[73] Assignee: Minnesota Mining and Manufacturing Company, St. Paul, Minn.

[21] Appl. No.: 569,825

[22] Filed: Aug. 20, 1990

[51] Int. Cl.⁵ .......................... B32B 7/10; B32B 9/00; C09J 7/02
[52] U.S. Cl. .............................. 428/36.92; 428/34.2; 428/40; 428/195; 428/343; 428/354; 428/908; 428/915; 428/916; 206/459; 206/807; 215/230; 283/105; 229/212
[58] Field of Search ..................... 428/36.92, 916, 915, 428/195, 908, 40, 34.2, 354, 343; 206/459, 807, 631; 215/230; 283/105

[56] References Cited

U.S. PATENT DOCUMENTS

| | | |
|---|---|---|
| 4,454,956 | 6/1984 | Patterson . |
| 4,537,327 | 8/1985 | Lu . |
| 4,557,505 | 12/1985 | Schaefer et al. . |
| 4,595,114 | 6/1986 | Lu . |
| 4,876,123 | 10/1989 | Rivera et al. . |
| 4,980,222 | 12/1990 | Rivera ................................. 428/195 |

Primary Examiner—Ellis P. Robinson
Assistant Examiner—Rena Dye
Attorney, Agent, or Firm—Gary L. Griswold; Walter N. Kirn; David L. Weinstein

[57] ABSTRACT

Tamper-indicating tape comprising a light transmissive monolayer film having opposing first and second major surfaces. On each surface is printed colored indicia, preferably identical, such that the colored indicia on each surface obscure the colored indicia on the opposing surface when the film has not been split internally, but neither of the colored indicia obscure the other when the film has been split internally.

19 Claims, 2 Drawing Sheets

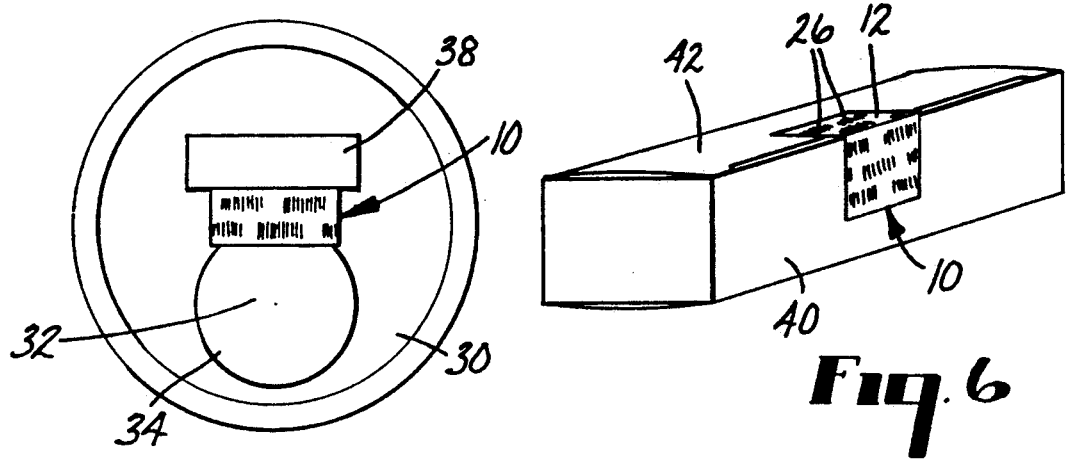
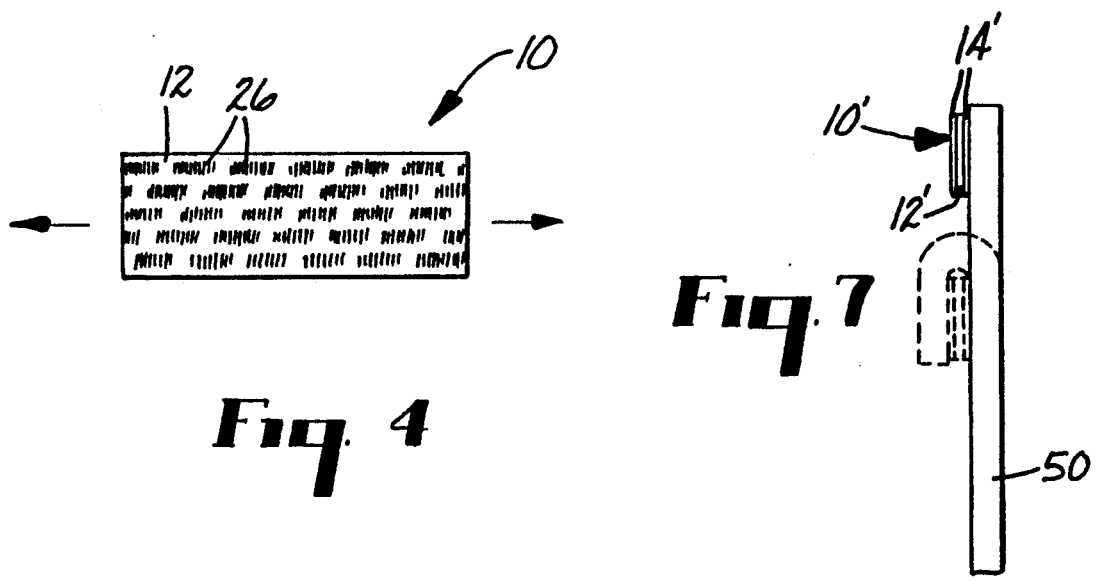

5,082,702

TAMPER-INDICATING TAPE

BACKGROUND OF THE INVENTION

1. Field of the Invention

The present invention relates to a tamper-indicating tape for use with a container to indicate opening of the container.

2. Discussion of the Art

U.S. Pat. No. 4,876,123 discloses a tamper-indicating tape for securing a first container part to a second container part to enclose an opening in the container. The tamper-indicating tape includes a light-transmissive monolayer film having opposing first and second major surfaces.

First colored indicia are printed on the first major surface of the film and second colored indicia are printed on the second major surface of said film. The first and second indicia have contrasting colors. Adhesive means is provided for adhering the film to the first and the second container parts with a bond strength greater than the force required to split the film. The adhesive means is coated on the first major surface of the film opposite the second indicia with a color substantially identical with the color of the second indicia so that the second indicia are obscured when viewed against the adhesive means through the second major surface of the film.

When the film is split, such as if the tape is attempted to be removed from the container, it becomes opaque so that the first indicia are obscured when viewed through the split film, but the second indicia are perceptible over the split opaque film to indicate separation of the first and second container parts.

In order to prepare the tamper-indicating tape, it is necessary to print first colored indicia and second colored indicia in such a manner so as to obscure the indicia in the absence of tampering. This requirement is difficult to fulfill, because perfect registration and good color matching between the ink of the indicia and the dye or pigment of the adhesive is required. Accordingly, it would be desirable to find a way to utilize the film disclosed in U.S. Pat. No. 4,876,123 without having to resort to a printing pattern that requires skillful alignment of first colored indicia and second colored indicia and good matching of the ink of the indicia with the dye or pigment of the adhesive.

SUMMARY OF THE INVENTION

This invention provides a tamper-indicating tape comprising a light transmissive monolayer film having opposing first and second major surfaces. On each of said first and second major surfaces are indicia, preferably identical alphanumeric characters, printed in such a manner that the indicia on the first major surface and the indicia on the second major surface obscure each other when the film has not been split, but neither of the indicia obscures the other of the indicia when the film has been split. It is preferred that the indicia be identical or substantially identical to simplify the process for applying indicia to the film. However, it is not required that the indicia be identical or substantially identical.

The printing pattern of this invention dispenses with the requirement for accurate registration between first colored indicia and second colored indicia. The printing pattern further dispenses with the requirement for a color match between ink and adhesive.

BRIEF DESCRIPTION OF THE DRAWINGS

FIG. 4 is a plan view of a tamper-indicating tape constructed according to the present invention wherein arrows are included to show the direction of force that is applied to the tape.

FIG. 5 is a plan view of a can end bearing the tamper-indicating tape of the present invention.

FIG. 6 is a perspective view of a box bearing the tamper-indicating tape of the present invention.

FIG. 7 is a side view of an envelope bearing the tamper-indicating tape of the present invention.

DETAILED DESCRIPTION

As used herein, the term "alphanumeric" means consisting of both letters, numbers, punctuation marks, and mathematical symbols. "Alphanumeric" excludes band-like markings. The term "obscure" means conceal or hide from view, to a sufficient extent, as by or as if by covering wholly or in part, such that indicia are incapable of providing a readable message. The term "identical" means having such close resemblance and such minor difference as to be essentially the same. The term "split" means separated from end to end such that the monolayer film is converted to a bilayer film.

Figure 2:
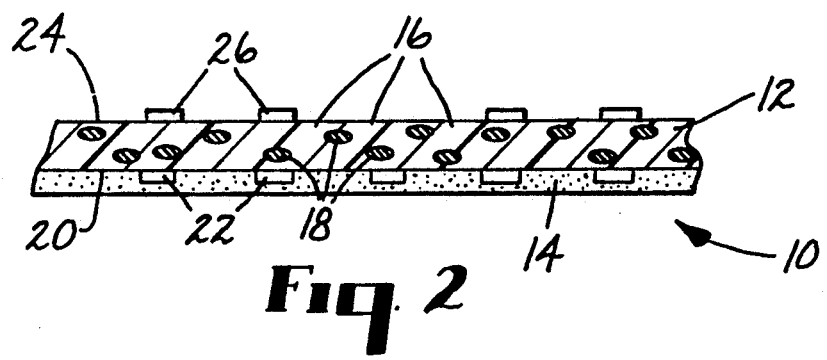
FIG. 2 is a cross-sectional view of a tamper-indicating tape constructed according to the present invention. In this view, the tape has not been split.

Referring now to FIG. 2, tape 10 comprises a film 12 bearing on at least one major surface thereof means 14 for adhering film 12 to a container.

Film 12 suitable for use in preparing tape 10 of this invention is fully described in U.S. Pat. No. 4,876,123, incorporated herein by reference.

Film 12 is derived from a composition comprising 50 to 85 parts by weight of a first copolymer comprising at least one moiety derived from at least one olefinic monomeric unit and 50 to 15 parts by weight of a second copolymer comprising at least one moiety derived from at least one vinyl alcohol monomeric unit.

In one embodiment of the film, the first copolymer includes from 0 to 15 parts by weight of monomeric units from a polar copolymerizable monomer substantially free of hydroxy (—OH) groups such as one of the following monomers: acrylic acid, acrylonitrile, bicyclo [2,2,1] hept-2-ene, bis($\beta$-chloroethyl)vinylphosphonate, carbon monoxide, diethyl fumarate, diethyl maleate, ethyl acrylate, methacrylic acid, N-methyl-N-vinylacetamide, styrene, vinyl acetate, vinyl chloride, and vinyl fluoride. Preferably, the polar copolymerizing monomer includes moieties derived from one of the following monomers: acrylic acid, methacrylic acid and vinyl acetate.

In one preferred embodiment, the first copolymer comprises at least 90 parts by weight olefinic monomeric units having from two to four carbon atoms and in the most preferred embodiment, the first polymer comprises about 97 parts by weight propylene monomeric units and from about 2.2 parts by weight to about 2.7 parts by weight ethylene monomeric units.

In another pre invention, the second copolymer is a copolymer comprising hydrolyzed ethylene vinyl acetate monomeric units, and in the most preferred embodiment of the invention, the second copolymer is a copolymer comprising ethylene vinyl alcohol monomeric units.

The second copolymer is sufficiently incompatible with the first copolymer to form two phases within the film. One of said phases 16 is continuous, preferably the phase formed by the first copolymer. The second phase 18, preferably that formed by the second copolymer, forms a multiplicity of inclusions 18 in the film, typically ellipsoidal in shape.

In the most preferred embodiment of the film, the film comprises about 75% of the first copolymer and about 25% of the second copolymer. The first copolymer comprises about 97 parts by weight propylene monomeric units and from about 2.2 parts by weight to about 2.7 parts by weight ethylene monomeric units. The second copolymer is ethylene vinyl alcohol. The ellipsoidal inclusions 18 formed by the second copolymer have been measured and found to have diameters ranging from approximately 0.8 to 3.3 microns and lengths ranging from approximately 1.6 to 13.1 microns. Additional description of the film can be found in U.S. Pat. No. 4,876,123, incorporated herein by reference.

On one major surface 20 of film 12 are printed first indicia 22 that provides a message which indicates that the container to which tape 10 has been adhered has been subjected to tampering. On the other major surface 24 of film 12 are printed second indicia 26 that provide a message which indicates that the container to which tape 10 has been adhered has been subjected to tampering. Before tape 10 has been subjected to tampering, first indicia 22 must obscure second indicia 26, and, likewise, second indicia 26 must obscure first indicia 22. First indicia 22 and second indicia 26 are preferably formed of alphanumeric characters, which indicate that some form of tampering has occurred.

Figure 1:
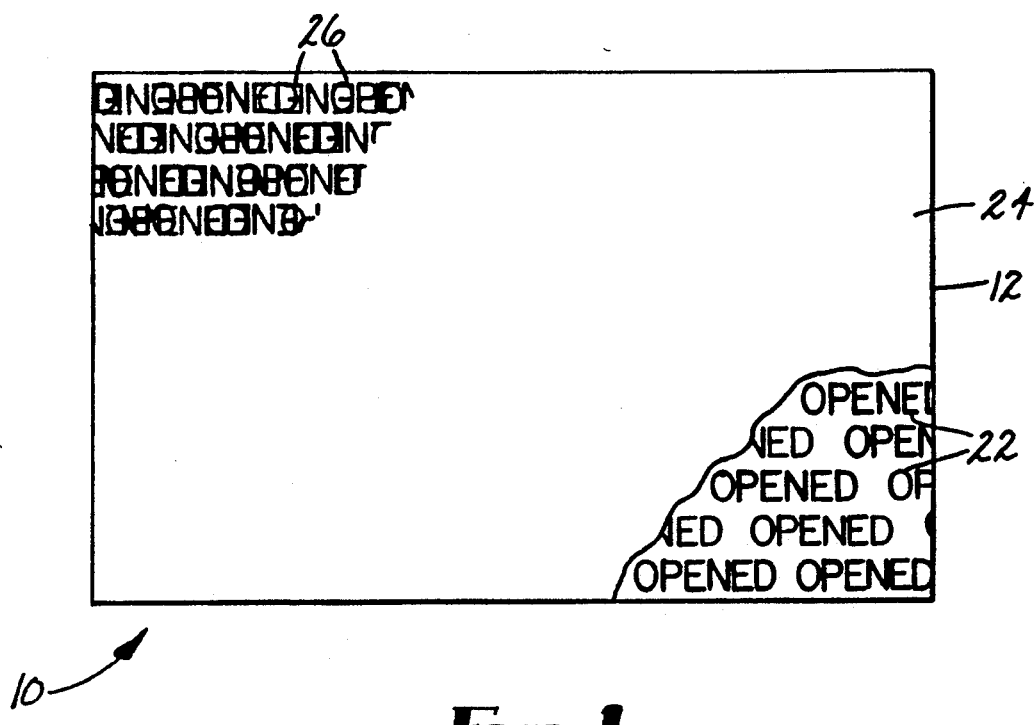
FIG. 1 is a plan view of a tamper-indicating tape constructed according to the present invention.

FIG. 1 shows how first indicia 22 obscures second indicia 26. In the embodiment shown in FIG. 1, first indicia 22 spells out the word "OPENED"; second indicia 26 also spells out the word "OPENED". In the word "OPENED" on surface 20, the letters "O", "P", "E", "N", "E", and "D" are written in the order shown from left to right. In the word "OPENED" on surface 24, the letters "O", "P", "E", "N", "E", and "D" are also written in the order shown from left to right but are also upside down; however, because film 12, when unsplit, is transparent, the letters "O", "P", "E", "N", "E", and "D" on surface 24 combine with the letters "O", "P", "E", "N", "E", and "D" on surface 20 to obscure the word "OPENED" on surface 20 and the word "OPENED" on surface 24 so that they are both unreadable. In order for first indicia 22 to obscure second indicia 26, and vice versa, it is preferred that at least one-half of the length and one-half of the width of each of the first indicia be superimposed (overlapped) by at least one-half of the length and one-half of the width of each of the second indicia. Because this degree of superimposition (overlapping) is difficult to carry out in practice, it is not required that each of the first indicia and each of the second indicia be superimposed (overlapped); it is sufficient that enough of each indicia are superimposed (overlapped). such that the message is unreadable. For example, for the word "OPENED", it is sufficient that the letters "E", "N", "E", and "D" be obscured while the letter "O" and the letter "P" remain readable.

The absolute size of each of the indicia is not critical; however, the size of each of the indicia must be sufficiently small so that the entire message can be printed on the tape, e.g., critical characters ought not be omitted, neither the lower nor upper halves of the characters ought be cut off.

For ease in printing, it is preferred that the first colored indicia and the second colored indicia be identical or substantially identical.

Means 14 are provided to adhere the film to a part or parts of a container. The container can be a box, envelope, bag, can, etc. Although any suitable adhering means 14 may be used, such as a layer of heat-activated adhesive or a layer of pressure-sensitive adhesive, in the preferred embodiment of the invention, adhering means 14 is a layer of pressure-sensitive adhesive, such as resin-tackified synthetic rubber-based adhesives, and, in particular, styrene-butadiene rubber, styrene-isoprene-styrene, and styrene-butadiene-styrene rubber; acrylic adhesives, and, in particular, isooctylacrylate-acrylic acid; and tackified natural rubber-based adhesives. For instance, the pressure-sensitive adhesive provided with tape number 373, marketed by the Minnesota Mining and Manufacturing Company, St. Paul, Minnesota, has been found suitable for use in the tamper-indicating tape of this invention.

Tapes of the present invention bearing a layer of adhesive on one major surface thereof can be used in several applications. A single-coated tape of the present invention can be used as a tamper-indicating tape for can ends in the manner of the tape disclosed in U.S. Pat. No. 4,557,505, incorporated herein by reference. Such an application is shown in FIG. 5.

Figure 3:
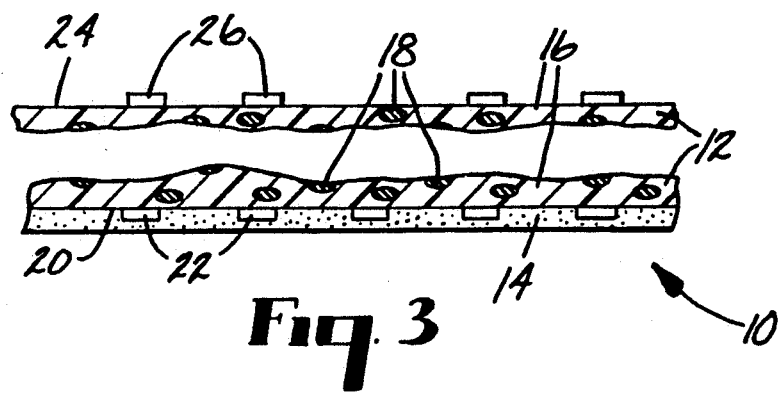
FIG. 3 is a cross-sectional view of a tamper-indicating tape constructed according to the present invention. In this view, the tape has been split.

The tape of this invention is suitable for use as the tamper-indicating tape on a tape closure for a can end as generally illustrated in FIG. 5. FIG. 5 depicts a can end 30 having an aperture 32 covered and sealed by a closure tape 34, with the tamper-indicating tape 10 being firmly adhered to the upper surface of closure tape 34. Tamper-indicating tape 10 is adhered to closure tape 34 by means of layer of adhesive 14. First indicia 22 and second indicia 26 obscure each other when the monolayer film 12 of tamper-indicating tape 10 is unstressed and unsplit. When tab 38 of closure tape 34 is pulled to detach closure tape 34 from can end 30, monolayer film 12 of tamper-indicating tape 10 is caused to split internally by the stress induced therein by pulling tab 38. This internal splitting, though slight, is sufficient to cause air to enter the interface between the separated portions of monolayer film 12, causing that film to opacify, thereby allowing the message on the surface thereof to be discernible. Tamper-indicating tape 10 has the printed message "OPENED" formed by second indicia, i.e., the indicia on the major surface not bearing the layer of adhesive, clearly visible on the surface showing that closure tape 34 has been subject to attempted or completed removal. FIG. 3 depicts the tape of this invention after it has been split internally. FIG. 4 depicts directions in which force can be applied to induce sufficient stress to cause the tape of this invention to split internally.

A single-coated tape can also be used as a tamper-indicating tape for sealing boxes and both transparent and opaque envelopes. A box-sealing application is shown in FIG. 6. Layer of adhesive 14 bonds to film 12, to first container part 40, and to second container part 42 with a bond strength that is greater than the force required to split film 12 internally. Layer of adhesive 14 may be covered by a removable liner, such as a silicone release liner (not shown) prior to application to first and second container parts 40 and 42. After tape 10 has been secured to first and the second container parts 40 and 42, any separation of the container parts will result in internal splitting of film 12 at a predetermined level of peel force. Upon splitting, the separated portions of the film become opaque due to surface irregularities in the exposed internal surfaces of the film created during the splitting of the film. Second indicia 26 are no longer obscured, but are now readily perceptible against the white opaque background of the separated film portions. This provides an unambiguous indication of unauthorized access to the contents of the container. Another feature of this invention is that the separated film portions will not readhere to each other once separated. This provides a further indication of unauthorized access to the interior of a container.

Tapes of the present invention having layers of adhesive on both major surfaces thereof, i.e., a double-coated tape, is also useful. In a double-coated tape embodiment, a message indicative of tampering can be read from either major surface of the tape. For example, as shown in FIG. 7, a double-coated tape 10' wherein layers of adhesive 14' are adhered to each major surface of film 12' can be used to seal a transparent plastic bag or envelope 50. Layers of adhesive 14' and film 12' can have the same characteristics of layer of adhesive 14 and film 12, respectively.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A tamper-indicating tape for securing a first container part to a second container part to enclose an opening in the container consisting of:
   (a) a light transmissive film derived from a composition comprising 50 to 85 parts by weight of a first copolymer comprising at least one moiety derived from at least one olefinic monomeric unit and 50 to 15 parts by weight of a second copolymer comprising at least one moiety derived from at least one vinyl alcohol monomeric unit and said second copolymer being sufficiently incompatible with said first copolymer to form two phases within said film, one of said phases being continuous, said film having a first major surface and an opposing second major surface;
   (b) first colored indicia printed on said first major surface of said film;
   (c) second colored indicia printed on said second major surface of said film, said first indicia obscuring said second indicia sufficiently so that said second indicia are unreadable, prior to said tape's being subjected to tampering, and said second indicia obscuring said first indicia sufficiently so that said first indicia are unreadable prior to said tape's being subjected to tampering;
   (d) means for adhering said film to the first and the second container parts with a bond strength greater than the splitting force of said film, said adhesive means being coated on at least one major surface of said film,
   (e) whereby when said film is split, the film becomes opaque so that said first and second indicia are perceptible over said split opaque film to indicate separation of the container parts.

2. The tamper-indicating tape of claim 1, wherein said first copolymer comprises at least 90 parts by weight olefinic monomeric moieties having two to four carbon atoms.

3. The tamper-indicating tape of claim 2, wherein said first copolymer comprises about 97 parts by weight propylene monomeric moieties and from about 2.2 parts by weight to about 2.7 parts by weight ethylene monomeric moieties.

4. The tamper-indicating tape of claim 1, wherein said first copolymer further comprises from 0 to 15 parts by weight of a polar copolymerizable monomer substantially free of hydroxy (—OH) groups 5. The tamper-indicating tape of claim 1, wherein said first copolymer further comprises from 0 to 15 parts by weight of a polar copolymerizable monomer substantially free of hydroxy (—OH) groups selected from the group consisting of acrylic acid, acrylonitrile, bicyclo hept-2-ene, bis ($\beta$-chloroethyl)vinylphosphonate, carbon monoxide, diethyl fumarate, diethyl maleate, ethyl acrylate, methacrylic acid, N-methyl-N-vinylacetamide, styrene, vinyl acetate, vinyl chloride, and vinyl fluoride.

6. The tamper-indicating tape of claim 1, wherein said first copolymer further comprises from 0 to 15 parts by weight of a polar copolymerizable monomer substantially free of hydroxy (—OH) groups selected from the group consisting of acrylic acid, methacrylic acid, and vinyl acetate.

7. The tamper-indicating tape of claim 1, wherein said second copolymer is a copolymer of hydrolyzed ethylene vinyl acetate.

8. The tamper-indicating tape of claim 7, wherein said second copolymer is ethylene vinyl alcohol.

9. The tamper-indicating tape of claim 1, wherein said adhesive means includes a pressure-sensitive adhesive layer coated on at least one major surface of said film.

10. The tamper-indicating tape of claim 1, wherein said first colored indicia are identical or substantially identical to said second colored indicia.

11. The tamper-indicating tape of claim 1, wherein said first colored indicia and said second colored indicia consist of alphanumeric characters.

12. An article comprising:
   (a) a container having an opening therein; and
   (b) a tamper-indicating tape for enclosing said opening in said container, said tape consisting of:
      (i) a light transmissive film derived from a composition comprising 50 to 85 parts by weight of a first copolymer comprising at least one moiety derived from at least one olefinic monomeric unit and 50 to 15 parts by weight of a second copolymer comprising at least one moiety derived from at lest one vinyl alcohol monomeric unit and said second copolymer being sufficiently incompatible with said first copolymer to form two phases within said film, one of said phases being continuous, said film having a first major surface and an opposing second major surface;
      (ii) first colored indicia printed on said first major surface of said film;
      (iii) second colored indicia printed on said second major surface of said film, said first indicia obscuring said second indicia sufficiently so that said second indicia are unreadable, prior to said tape's being subjected to tampering, and said second indicia obscuring said first indicia sufficiently so that said first indicia are unreadable prior to said tape's being subjected to tampering;

(iv) means for adhering said film to the first and the second container parts with a bond strength greater than the splitting force of said film, said adhesive means being coated on at least one major surface of said film, (v) whereby when said film is split, the film becomes opaque so that said first and second indicia are perceptible over said split opaque film to indicate separation of the container parts.

13. The article of claim 12, wherein said adhesive means includes a pressure-sensitive adhesive layer coated on at least one major surface of said film.

14. The article of claim 12, wherein said first colored indicia are identical or substantially identical to said second colored indicia.

15. The article of claim 12, wherein said first colored indicia and said second colored indicia consist of alphanumeric characters.

16. An article comprising:
(a) a container having a lid thereon, said lid having an aperture therein, said aperture being covered by a closure tape adhered to said lid by means of a layer of adhesive; and
(b) a tamper-indicating tape adhered to said closure tape, said tamper-indicating tape consisting of:
(i) a light transmissive film derived from a composition comprising 50 to 85 parts by weight of a first copolymer comprising at least one moiety derived from at least one olefinic monomeric unit and 50 to 15 parts by weight of a second copolymer comprising at least one moiety derived from at lest one vinyl alcohol monomeric unit and said second copolymer being sufficiently incompatible with said first copolymer to form two phases within said film, one of said phases being continuous, said film having a first major surface and an opposing second major surface;

(ii) first colored indicia printed on said first major surface of said film;

(iii) second colored indicia printed on said second major surface of said film, said first indicia obscuring said second indicia sufficiently so that said second indicia are unreadable, prior to said tape's being subjected to tampering, and said second indicia obscuring said first indicia sufficiently so that said first indicia are unreadable prior to said tape's being subjected to tampering;

(iv) means for adhering said film to the first and the second container parts with a bond strength greater than the splitting force of said film, said adhesive means being coated on at least one major surface of said film, (v) whereby when said film is split, the film becomes opaque so that said first and second indicia are perceptible over said split opaque film to indicate separation of the container parts.

17. The article of claim 16, wherein said adhesive means includes a pressure-sensitive adhesive layer coated on at least one major surface of said film.

18. The article of claim 16, wherein said first colored indicia are identical or substantially identical to said second colored indicia.

19. The article of claim 16, wherein said first colored indicia and said second colored indicia consist of alphanumeric characters.

* * * * *

UNITED STATES PATENT AND TRADEMARK OFFICE
CERTIFICATE OF CORRECTION

PATENT NO. : 5,082,702
DATED : January 21, 1992
INVENTOR(S) : Alband

It is certified that error appears in the above-identified patent and that said Letters Patent is hereby corrected as shown below:

Col. 2, line 66, "pre invention" should be --preferred embodiment of the invention--.

Col. 6, line 55, "lest" should be --least--.

Col. 7, line 34, "lest" should be --least--.

Signed and Sealed this

Twenty-fifth Day of January, 1994

Attest:

BRUCE LEHMAN

Attesting Officer    Commissioner of Patents and Trademarks